Oct. 22, 1940.    J. R. ALMOND ET AL    2,219,062
POWER OPERATED BRAKE
Filed June 23, 1939    4 Sheets-Sheet 2
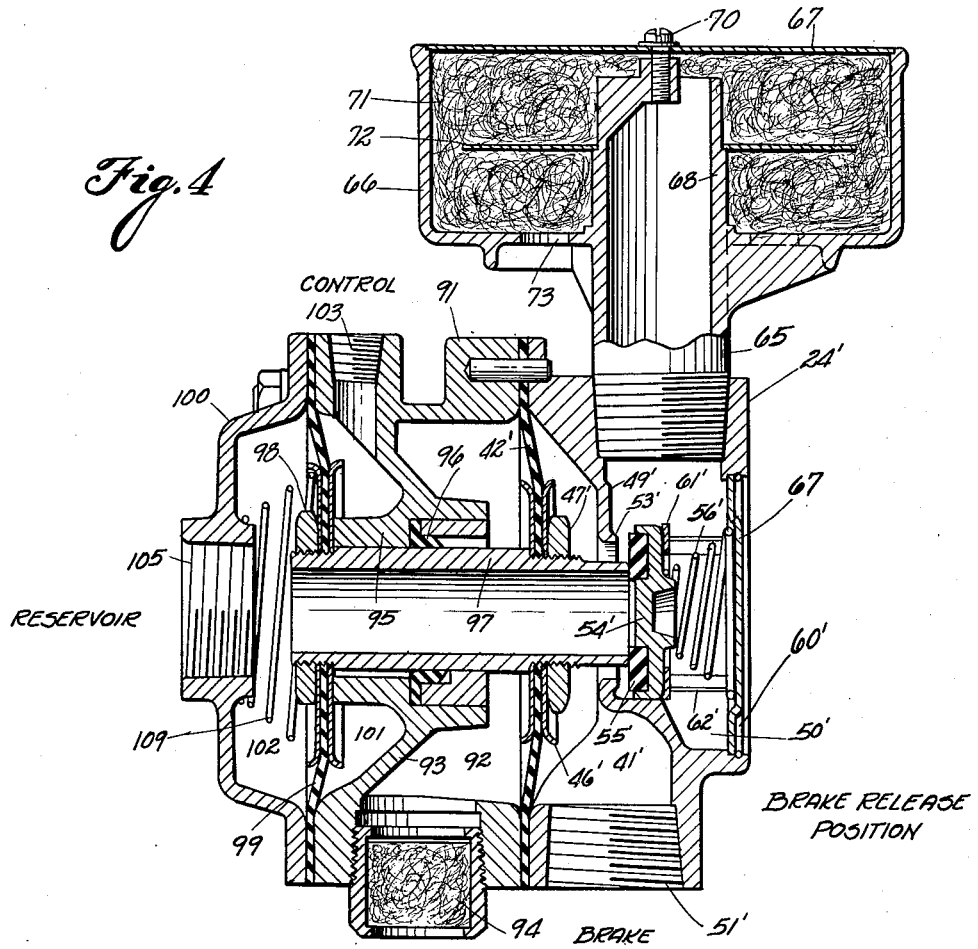
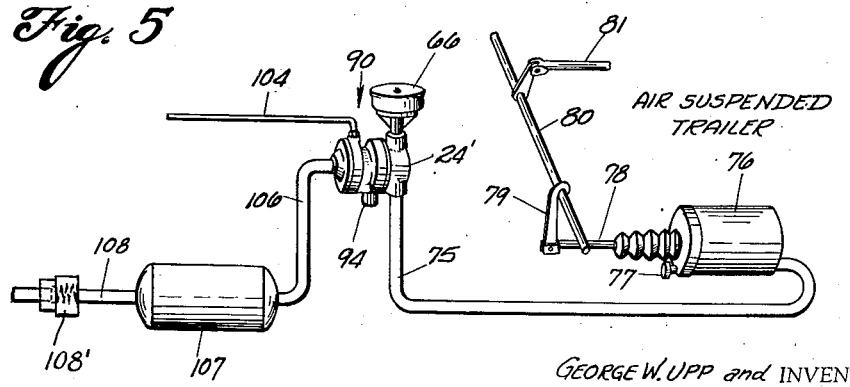
GEORGE W. UPP and INVENTORS
JOHN R. ALMOND
BY
ATTORNEY.

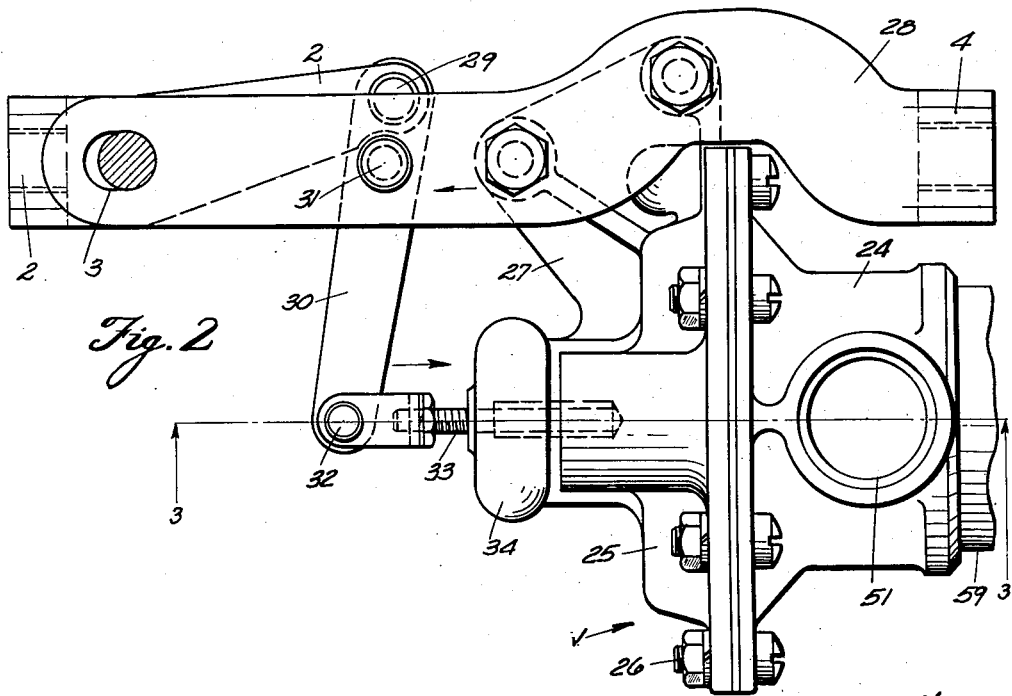
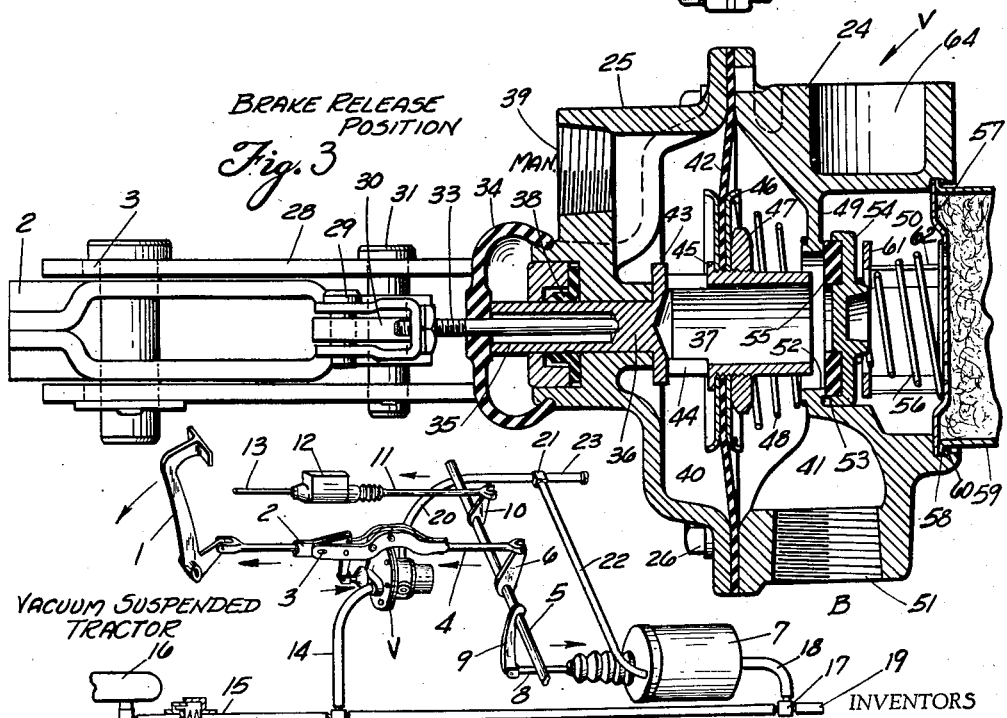

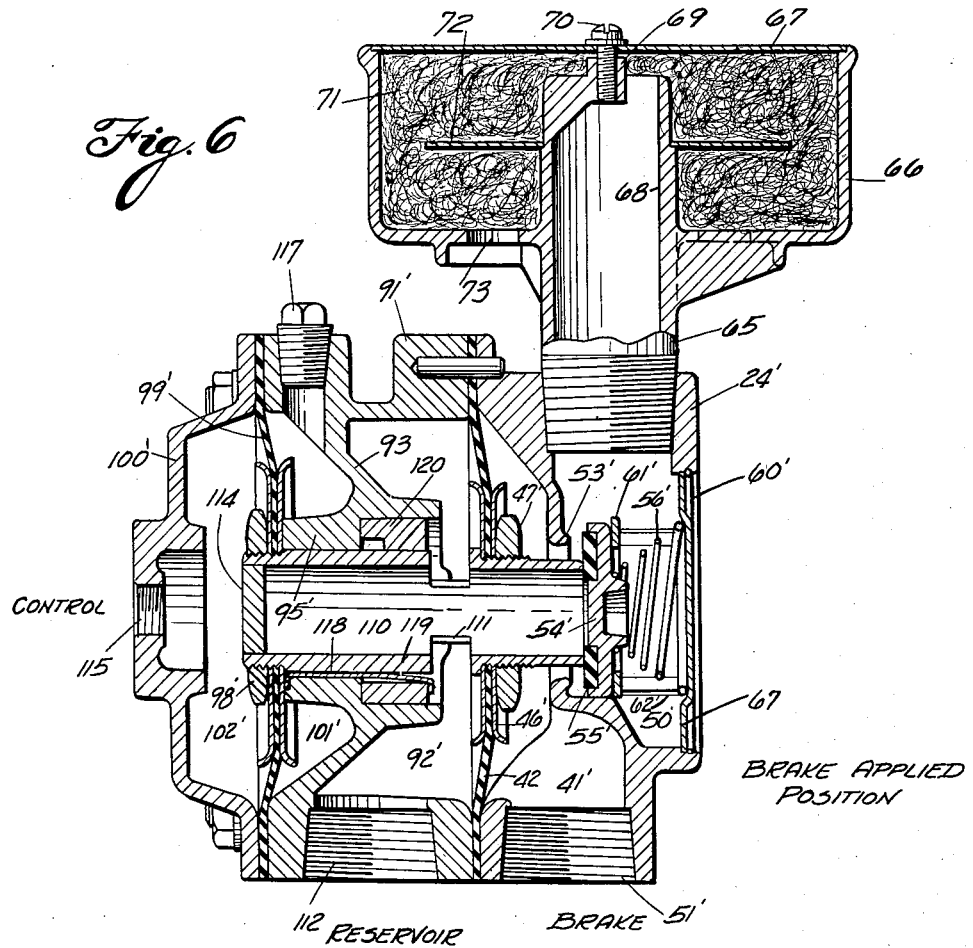
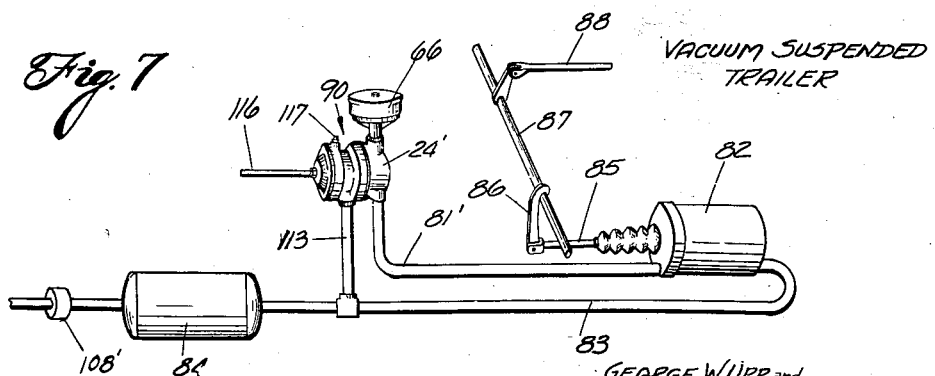

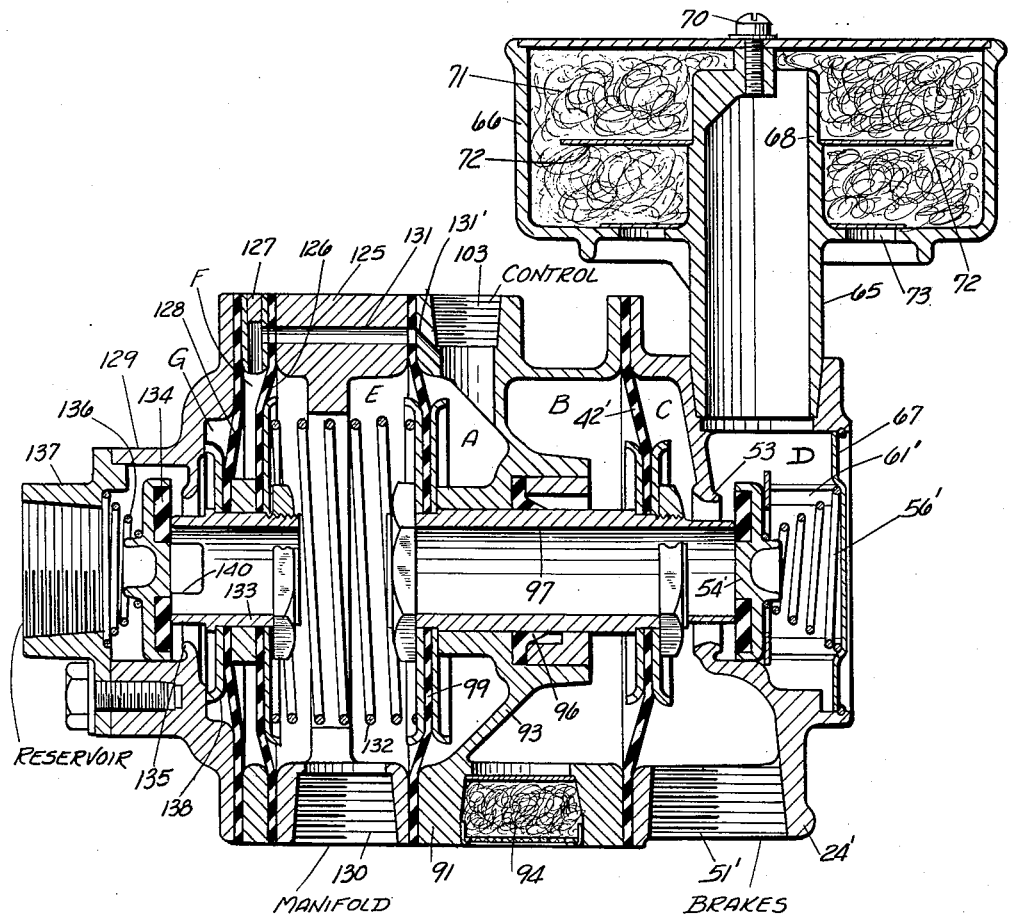

Patented Oct. 22, 1940

2,219,062

UNITED STATES PATENT OFFICE 2,219,062

POWER OPERATED BRAKE

John R. Almond, Cleveland, and George W. Upp, Lakewood, Ohio, assignors to The Midland Steel Products Company, Cleveland, Ohio, a corporation of Ohio Application June 23, 1939, Serial No. 280,853

18 Claims. (Cl. 303—31)

This invention relates to new and useful improvements in power operated brakes of the type employed for the operation of the brakes of trucks and trailers.

An important object of the invention is to provide for improved operation of the brake with a special type of valve having a diaphragm which not only serves the usual function of a pressure responsive partition, but is provided with a floating metallic seat by which a single floating valve is operated to control pressures in three different chambers without using the material of the diaphragm as a valve seat. This diaphragm material used in such devices, being subjected to moisture and gasoline vapors and being flexed and seated adjacent its central opening, proves very detrimental to longevity and serviceability of the valve seat, so that elimination of the diaphragm material from wear and tear of its service as a valve seat, enhances the life of the valve very materially. Thus, a valve is provided which is freer from leakage than those using the diaphragm material as a valve seat and will maintain the desired degree of vacuum for longer periods of time.

In the field of vacuum brakes for trucks and trailers of so many existing models, varieties and combinations, there is occasion for the use of varied systems of hookups, with demand for flexibility of equipment and ease of conversion to meet the various conditions and requirements in the field. Therefore, another aim of the invention is to provide valves with inexpensive and durable parts which can be used interchangeably in different valves to reduce their cost of production, maintenance and their cost to users of this equipment.

Another important object of the invention is to provide means in a truck and trailer installation for reducing the time required to obtain maximum application of the brakes on the trailer while maintaining trailer reservoir pressure.

Another object of the invention is to provide relay valves which can be partly made up from parts of the foot control valve, and can be readily converted for use in either air or vacuum suspended trailer brakes.

Other objects and advantages of the invention will become apparent during the course of the following description.

In the accompanying drawings forming a part of the application and wherein like numerals are employed to designate like parts throughout the several views, Fig. 1 is a layout showing the improved foot control valve installed in hydraulic brake system, Fig. 2 is an enlarged side elevation of the foot control valve, Fig. 3 is a longitudinal section of the same taken on the line 3—3 of Fig. 2, Fig. 4 is a longitudinal section of the improved form of relay valve, Fig. 5 is a layout showing the installation of the relay valve in the trailer brake system, Fig. 6 is a longitudinal section through a modified form of this relay valve, Fig. 7 is a layout showing the latter installed in the brake system of a trailer, Fig. 8 is a longitudinal section of another modified form of relay valve.

Referring now more particularly to the drawings and to Fig. 1, the numeral 1 designates the usual foot brake pedal of an automotive vehicle having a rod section 2 connected by a lost motion device 3 to a rod section and valve carrier 4. This latter rod section 4 is connected to a brake cross shaft 5 by means of a lever 6. The means for power operating this brake shaft is the usual vacuum power actuator 7 or cylinder having a pressure operated piston therein, the rod 8 of which is pivotally connected to a lever 9 fastened to the brake shaft. This brake shaft may be connected with a mechanical brake operating mechanism, or by means of a lever 10 may operate the piston rod 11 of a hydraulic master cylinder 12 which forces the hydrau"ic medium to the individual brakes at the wheels through the piping 13 in the usual manner.

The foot control valve is connected by a flexible pipe 14 with a vacuum pipe 15 having a check valve therein and leading from the intake manifold 16 back to a coupling 17 which has a pipe 18 leading to the rear end of the power cylinder and a pipe 19 leading to the rear end of the vehicle where it may be connected with a trailer installation. Another flexible pipe 20 is also connected with the foot control valve and extends rearwardly to a coupling 21 which branches to a pipe 22 connected with the forward end of the power chamber 7. From the coupling 21 extends a pipe 23 to the rear end of the vehicle for connection with the piping of a trailer connection as will be presently described.

The control valve casing V is composed of a pair of sections 24 and 25 having complementary flanges connected together with bolts 26. The section 25 is provided with a fin like extension 27 which is fastened between a pair of carrier links 28 forming an extension of the rod section 4. The rod section 2 terminates in an angular end which is pivotally connected to the upper end as at 29 of a valve operating lever 30 fulcrumed at 31 between the carrier links 28. The lower end of this lever 30 is pivotally connected as at 32 to the forward end of a valve rod 33 which extends through a small rubber boot 34 and into the axial pocket 35 of the reduced end 36 of a valve member 37. This reduced portion 36 of the valve member is slidably mounted through an opening in casing section 25, which opening is packed with a packing gland 38. The forward wall of this casing section is provided with a port which is connected by the flexible piping 14 to the intake manifold by means of the conduit 15.

These two casing sections 24 and 25 provide a cavity which is divided into a pair of chambers 40 and 41 by means of a flexible diaphragm 42, the periphery of which is securely clamped between the complementary flanges of the two housing sections as illustrated. The tubular sleeve valve body 37 extends through the center of this diaphragm and is provided with a shoulder 43 adapted to engage an inwardly extending tubular extension of the casing section 25 to limit the retraction of the valve in release position. The valve sleeve adjacent the shoulder 43, is provided with slots 44 by which communication is had between the chambers 40 and 41 when the valve is in release position. A second annular shoulder 45 is provided upon the sleeve adjacent an external threaded portion, whereby a pair of washers 46 arranged on opposite sides of the diaphragm are clamped thereto by threading a nut 47 upon the sleeve valve as illustrated. In order to normally urge the valve toward release position, a conical compression spring 48 is arranged between the washer in chamber 41 and a partition 49 which separates the chamber 41 and a higher pressure chamber 50. The chamber 41 is provided with a threaded port 51 to which the conduit 20 is connected for transmitting pressure in this chamber to the brake cylinder 7.

The partition 49 is provided with an opening 52 much larger than and concentric with the end of the sleeve valve 37, the latter being disposed normally in close proximity thereto as illustrated in Fig. 3. This opening is surrounded by an annular valve seat 53 arranged in chamber 50 to form the seat of an air control valve 54. This valve 54 is a free floating disk provided with an annular flange to receive an elastic ring-like washer 55 adapted to be normally forced upon the seat 53 by reason of a conical compression spring 56 having one end engaging the disk and its opposite end bearing against a removable cover plate 57 provided with an apertured central depression to receive and center one end of the spring. This cover plate is received in an annular groove in the casing section 24 and is releasably retained therein along with the inner flanged end of a filter cover by means of a spring snap ring 60. In order to limit the opening movement of the air valve 54 a valve disk guard 61 is supported adjacent the air valve by means of its having a plurality of legs 62 encircling the spring 56 and bearing against the cover plate 57.

With the parts of the valve in the position shown in Fig. 3, the brakes are in release position with a lower pressure medium such as a partial vacuum existing in chambers 40 and 41 and thus into the forward end of the brake cylinder 7, due to the fact that the air valve 54 is in closed position as illustrated. To apply the brakes, the pedal 1 is depressed causing valve sleeve 37 to abut against the elastic washer 55 to cut off the lower pressure in chamber 41 and also to the forward end of the brake cylinder 7. Thus, there is a lapped position of the valve and upon slight further movement of the pedal, the sleeve valve 37 will force the air valve 54 against the tension of the springs 56 and 48 and off of its seat so as to admit a higher pressure medium or atmospheric pressure into the chamber 41 and thus into the forward end of the brake cylinder. A vacuum condition being maintained in the rear end of the brake cylinder through pipe 18, the piston rod of the brake cylinder will be caused to be moved to the right of the figure thereby turning the brake shaft 5 in a counter-clockwise direction to operate the master cylinder 12 and force the fluid medium to the individual wheel cylinders to apply the brakes. Due to the rod 4 being connected with the brake shaft, the valve casing is, during this operation, carried slightly forward to again place the valve in lapped position in the event the pedal is not depressed further. A further depression of the foot pedal will cause the air valve to again open and when the foot pedal is released, the usual retracting spring applied to the pedal or the springs in the individual brake mechanisms at the wheels will cause the pedal to return to normal position thereby relaxing tension upon both springs 48 and 56 which returns the valve parts to their normal position shown in Fig. 3 whereby a partial vacuum is reestablished through the sleeve valve 37 and chamber 41 to set up a vacuum condition on opposite sides of the piston in the brake cylinder 7, which is of course, re-established in the pipe 23 leading back to the rear end of the vehicle for connection with a trailer mechanism to be described.

It will be noted that the casing section 24 is provided with a cylindrical depression 64 opposite the air chamber 50 for the purpose of interchangeability of this section for other forms of valves such as shown in Figs. 4 and 6 and when it is employed as the end section 24' of relay valves. In this event the bottom of the depression 64 is broken through to communicate with the air chamber 50 and the side walls of the depression are tapped for engagement with the lower threaded end 65 of an air cylinder 66 which replaces the air cylinder 59 shown in Fig. 3, in which event an imperforate cover plate 67 is employed in place of the perforated cover plate 57 in Fig. 3. The air filter 66 is of enlarged capacity with an imperforate cover 67 and an enlarged central tube 68 extending through the chamber 66 to a point in close proximity to the cover 67 where it is provided with a radial extension 69 having a threaded aperture to receive a screw 70 for fastening the cover 67 in place on chamber 66. This air cylinder 66 is filled with filtering material 71 such as hair which is somewhat supported midway of the chamber by a disk 72 supported upon a shoulder of the tube 68. The bottom of the chamber 66 is provided with a plurality of openings 73 for the entrance of atmospheric air and for drainage of any moisture drawn into the filter. Thus, this air filter forms an interchangeable part for the two forms of relay valve shown in Figs. 4 to 8. Likewise the end casing section 24' with its associated parts forms a second interchangeable section for all valves, and parts corresponding to those in Fig. 3 are designated with corresponding numerals with prime coefficients added.

In Figs. 4 and 5, brake port 51' is connected by a conduit 75 to the rear end of an air suspended trailer brake cylinder 76 which has its forward end open to the atmosphere through a filter 77. This brake cylinder 76 has the usual piston therein and piston rod 78 connected to a lever 79 secured to a brake shaft 80 for the operation of a brake rod 81 leading to the brake mechanism of the trailer. In Figs. 6 and 7 the brake port 51' is connected by a pipe 81' to the forward end of a vacuum suspended trailer brake cylinder 82, the rear end of which is connected by pipe 83 with a trailer vacuum reservoir 84. The brake cylinder piston rod 85 is also connected with a lever 86 secured to a brake shaft 87 which is connected to the brakes of the trailer through rod 88. The relay valve for the trailer in both instances is designated by the numeral 90 and is composed of interchangeable parts as will now be described.

Referring more particularly to the form of relay valve shown in Figs. 4 and 5, designed for a hook up of vacuum suspended tractor system and air suspended trailer system, an intermediate casing section 91 is secured to the casing section 24' to secure the diaphragm 42' therebetween and to form a substantially constant pressure chamber 92 between the diaphragm and a partition 93 in the casing section 91. At the bottom of this chamber an air cleaner 94 is screwed into place so that the pressure in chamber 92 is at all times atmospheric pressure and a suitable drain is provided thereby. The partition 93 is provided with a central bearing 95 and also a packing gland 96 for slidably receiving a valve sleeve 97 to which the diaphragm 42 is secured by the washers 46' and nuts 47'. The packing gland 96 is composed of an L-shaped gasket held clamped against the bearing 95 by a sleeve, press-fitted into the partition.

The end of the valve sleeve 97 opposite the end which engages the air valve 54', is reduced and threaded with exterior threads, the latter receiving a nut 98 to clamp a pair of washers upon opposite sides of a flexible diaphragm 99, with its outer margin clamped between housing section 91 and an outer housing section 100. This diaphragm defines a control chamber 101 between it and the partition 93, and a negative pressure chamber 102 between it and the outer wall of the section 100. The control chamber 101 is provided with a port 103 to which a pipe 104 is connected for connecting the relay valve with the control line 23 of the tractor. The cover section 100 of the relay valve is provided with a port 105 into which is secured a pipe 106 leading to one end of a trailer reservoir 107, the opposite end of the reservoir being connected by pipe 108 having a normally open check valve 108' such as shown at 230 in the copending Kuiper application Serial No. 78,870, filed May 9, 1936, with the vacuum pipe 19 of the tractor system. A compression spiral spring 109 is placed between the end wall of casing 100 and the diaphragm 99 to predominate over spring 56' at the other end of the housing so that the sleeve valve 97 is normally held against the air valve 54' to unseat it so that atmospheric pressure exists in chamber 41' and in the right hand end of brake cylinder 76 to be balanced against air pressure in the opposite end coming through the breather 77. Since the end of the sleeve valve 97 is sealed against the gasket 55' of the air valve, sub-atmospheric pressure from the reservoir is prevented from entering brake chamber 41'. This is the normal brake release position of the valve parts for this type of relay valve. In this normal position of the relay valve of Fig. 4, sub-atmospheric pressure exists in chamber 101 from the control line 104, but when an application of the brakes is made on the tractor, atmospheric pressure enters chamber 101 to move the diaphragm 99 to the left thereby permitting the air valve 54' to close while the cooperating end of the sleeve valve 97 is opened to connect brake chamber 41' with the trailer reservoir 107 through the hollow sleeve valve so that sub-atmospheric pressure is created in pipe 75 and the right hand end of brake cylinder 76 to move the piston rod 78 to the right of Fig. 5, thereby applying the brakes to the trailer simultaneously with the application of the brakes to the tractor. This lowering of pressure in brake chamber 41' permits the atmospheric pressure in chamber 92 to counterbalance that existing in chamber 101 to move the sleeve valve to a position where its end engages the elastic washer 55' of the air valve to maintain the valve parts in lapped position in the event the operator on the tractor maintains the position of the pedal to retain the tractor control valve in lapped position so that the relay valve takes a corresponding position. When the tractor foot pedal is released to brake release position, sub-atmospheric pressure is re-created in control chamber 101 so that atmospheric pressure in chamber 92 predominates and moves the valve sleeve 97 to the right to unseat the air control valve 54' and re-establish the air suspended condition in the trailer brake chamber 76. Since atmospheric pressure will then exist upon opposite sides of diaphragm 42 with sub-atmospheric pressure existing on opposite sides of diaphragm 99, the spring 109 will predominate to hold the air control valve open in brake release position.

The relay valve shown in Figs. 6 and 7 is very similar to that shown in Figs. 4 and 5, except that it is used for a vacuum suspended trailer system. Therefore, parts corresponding in the two figures are designated by the same numerals with the addition of prime coefficients in Figs. 6 and 7. In Fig. 6, the relay valve is shown in brake applied position, but in release position the modified form of sleeve valve 110 has its end disengaged from the elastic washer of the air controlled valve 54' so that a sub-atmospheric pressure exists in chamber 41' and the left hand end of brake cylinder 82. This condition is achieved by providing slots 111 in the sleeve valve 110 so that the interior of the valve sleeve is at all times in communication with the chamber 92', which in this instance is provided with a port 112 for connection with pipe 113 leading to the vacuum reservoir pipe 83. Instead of both ends of the valve sleeve being open as in the modification shown in Fig. 4, one end is closed by a press fit plug 114 which prevents the pressure existing in control chamber 102' from entering the valve sleeve. The control chamber is provided with a port 115 connecting with pipe 116 which is adapted to connect with the control line 23 of the tractor installation so that whatever pressure condition is set up in the brake chamber 41 of the tractor foot control valve, is also set up in control chamber 102'. The chamber 101' which in Fig. 4 was connected with the control line, is closed with a plug 117 so that the chamber 101' receives whatever pressure exists in negative pressure chamber 92' through the groove 118 provided in bearing 95' for the reception of a valve friction spring 119 laid lengthwise in the groove with one end hooking over the end of the bearing and the other end hooking over the end of the retainer ring 120, and the bowed intermediate portion of the spring frictionally engaging the valve sleeve 110.

In brake release position, the air valve 54' is closed upon its seat 53' by the spring 56' and the seating end of the valve sleeve 110 is disengaged from the air valve so that reservoir pressure in chamber 92' also exists in brake chamber 41' and in both ends of the cylinder 82. This negative pressure condition also exists in chambers 101' and 102' so that the diaphragms 42' and 99' are in balanced condition. Upon application of the tractor brakes, higher pressure is admitted through the control line into chamber 102' which moves the valve sleeve 110 into engagement with the air valve 54' to lift it from its seat 56', whereupon atmospheric pressure enters the brake chamber 41' and into one end of the brake chamber 82 to apply the trailer brakes. When the tractor brake pedal is held in brake applied position this relation of valve parts is maintained in lapped position so as to hold the trailer brakes as long as desired. When the tractor brake pedal is released, a negative pressure is again set up in control chamber 102 and with the higher pressure existing in chamber 41', the valve sleeve 110 is moved back to release position to disengage the air valve 54' and permit it to cut off the brake chamber 41' from atmospheric pressure, thereby returning the valve parts to brake release position.

In order to speed the time for obtaining maximum vacuum in an air suspended brake cylinder of a trailer installation involving a vacuum reservoir, the modified relay valve shown in Fig. 8, is provided with a delayed action check valve to the reservoir to normally open communication of both the reservoir and intake connection with the brake chamber upon initial brake action, and which then closes off the reservoir so that the intake connection has only to reduce pressure in the brake chamber without being called upon to also simultaneously reduce pressure in the reservoir, such reduction in the reservoir being postponed to intervals in which the valve is in brake release position. This is accomplished by the use of relay valve parts such as shown in Fig. 4 with the addition of two more diaphragms and a check valve controlling the reservoir connection. Thus, the parts of Fig. 8 which correspond to those in Fig. 4 are designated with reference numerals corresponding to those in Fig. 4. In addition to the two casing sections 24' and 91 which with the pair of diaphragms divide the casing into a control chamber A, and atmospheric pressure chamber B, a brake cylinder chamber C and an air chamber D; a casing section 125 is provided to clamp against the diaphragm 99. A third diaphragm 126 is clamped between a spacer member 127 and the section 125. A fourth diaphragm 128 is clamped between the spacer member 127 and an end cover 129, the latter providing a reservoir chamber G, and the space between the two diaphragms 126 and 128 defining a control chamber F. The space between the two diaphragms 99 and 126 defines an intake manifold chamber E which has a port 130 for connecting this chamber with the intake manifold pipe of the engine on the tractor. The casing section 125 is provided with a longitudinally extending port 131 which connects to a port 131' leading into chamber A, while the other end connects with a port which leads into chamber F. A compression coil spring 132 is positioned between the two diaphragms 99 and 126 to normally urge them apart. The two diaphragms 126 and 128 are spaced from one another by means of their being connected with an open ended sleeve 133 which has its outer forked end 140 engaged with a floating check valve 134 to normally hold it away from its seat 135 formed on casing section 129. This check valve 134 is similar to valve 54' and a compression conical spring 136 is positioned between the valve and the end of a nipple 137 providing a connection to the reservoir of the trailer. It will be noted that a washer 138 backs up the diaphragm 128 and is smaller than the washer backing up the diaphragm 126 to give a differential piston effect and the washer 138 is also employed to engage the housing section 129 to limit the outward movement of sleeve 133 as well as the check valve 134.

Thus, in normal operating position with the brakes released, the reservoir communicates with chamber E through sleeve 133, and the normal operation of the internal combustion engine maintains the reservoir at maximum vacuum. In an air suspended trailer system, the air control valve 54' is held off of its seat by valve sleeve 97 so that air passes into brake chamber C from D. Atmospheric pressure of course, exists in chamber B while chamber A is subjected to a vacuum condition which carries over through passage 131 into chamber F. Thus, diaphragm 40 is air balanced and 99 is vacuum balanced so that the spring 132 holds the valve 54' open against its spring 56. Also the diaphragms 126 and 128 are balanced in vacuum so that the spring 132 also holds the check valve 134 off of its seat 135 against the tension of spring 136.

When the brakes on the tractor are applied, a higher pressure enters control chambers A and F thereby moving diaphragms 99 and 126 toward one another. Upon initial action of this relay valve, the valve sleeve 97 moves to permit closing of the air valve 54' and subsequent opening of the sleeve to chamber C so that both the reservoir and manifold will momentarily withdraw air from the brake chamber C. After this momentary operation and pressures in chamber C and G are equalized, the sleeve 133 moved farther to the right permitting the check valve 134 to close upon the seat 135 which cuts off the reservoir from the low pressure chamber E so that the manifold pressure in E can continue to reduce pressure in brake chamber C without exhausting or further reducing reservoir pressure at the same time. Thus, we get a speedier initial action of the trailer brakes and reach a maximum vacuum quicker with this arrangement. As soon as the brakes are released and the positive pressures in chambers A and F are reduced to negative pressures, the spring 132 moves the two sleeves 97 and 133 in opposite directions to open the check valve 134, whereby maximum vacuum can be quickly re-established in the reservoir since the sleeve 97 has been closed by abutment with the air valve 54' to move it off of its seat to restore atmospheric pressure to the chamber C.

To assure proper valve movements under all conditions of operation, and a balance of pressure between the control and brake chambers in brake release position different sized washers or diaphragm plates giving different effective areas to the diaphragms, are employed in the relay valves.

In Fig. 4 the diaphragm plates of diaphragm 99 are 2²¹⁄₃₂ inches in diameter while those of diaphragm 42' are 2 inches in diameter.

In Fig. 6, the plates of diaphragm 99' are 2²¹⁄₃₂ inches in diameter while those of diaphragm 42' are 2⁵⁄₁₆ inches in diameter.

In Fig. 8 the diaphragm plates of diaphragms 42' and 128 are 2 inches while those of diaphragms 99 and 126 are 2²¹⁄₃₂ inches in diameter.

Having thus described the construction and operation of the devices it will be understood that various modifications of parts and their relation may be made without departing from the spirit of the invention or the scope of the appended claims.

We claim:

1. A vacuum control valve comprising a casing having a pressure chamber with valve seat, an air valve disk with a seating face floatably mounted and normally urged with its seating face towards said seat, a diaphragm dividing said casing into a pair of separate chambers and having a hollow hub normally communicating said pair of separate chambers and adapted to be moved to seat upon the seating face of said valve to cut off communication between said chambers and to move said valve off of its seat to establish communication between said pressure chamber and one of said separate chambers.

2. A vacuum control valve comprising a casing having a partition with a port therein, a valve seat surrounding said port, an air valve disk with a seating face floatably mounted with its seating face urged toward said seat to cut off the entrance of atmospheric pressure into said casing, a diaphragm dividing said casing into separate chambers and having a hollow hub adapted to be moved to and from seating engagement with the seating portion of said valve and to move said valve off of its seat, and said hub causing said separate chambers to communicate when disengaged from the valve and to cut off communication between said chambers when engaged with the valve.

3. A vacuum control valve comprising a casing having a partition therein provided with an opening and a valve seat surrounding the same, a valve disk on one side of the partition and provided with a plain elastic face normally urged toward said seat, a diaphragm in said casing on the opposite side of said partition, an open-ended metallic sleeve carried by the diaphragm and arranged co-axially of said opening and seat whereby limited axial movement of the sleeve engages and disengages the sleeve from the elastic face of said valve and moves the valve disk to engage and disengage said elastic face and the valve disk from its seat.

4. A vacuum control valve comprising a casing having a partition therein provided with an opening and a valve seat surrounding the same, a valve disk on one side of the partition and provided with a plain elastic face normally urged toward said seat, a diaphragm in the casing on the opposite side of said partition, an open ended metallic sleeve carried by the diaphragm and arranged co-axially of said opening and seat whereby limited axial movement of the sleeve in one direction engages the elastic face of the valve and removes it from its seat, and movement in the opposite direction allows engagement of the elastic face with its seat and causes disengagement of the sleeve from said valve.

5. A vacuum control valve comprising a casing having a partition therein provided with an opening and a valve seat surrounding the same, a valve disk on one side of the partition and provided with a plain elastic face normally urged toward said seat, a diaphragm in the casing on the opposite side of said partition, an open ended metallic sleeve carried by the diaphragm and arranged coaxially of said opening and seat whereby limited axial movement of the sleeve in one direction engages the elastic face of the valve and removes it from its seat, and movement in the opposite direction allows engagement of the elastic face with its seat and causes disengagement of the sleeve from said valve, and spring means normally biasing the diaphragm in one direction to pre-arrange the sleeve relative to the valve.

6. A vacuum control valve for vacuum brakes comprising a casing having a pair of partitions therein, one of said partitions having an opening and a valve seat and the other having a packing therein, said partition with the valve seat and opening defining an air chamber between it and the end wall of the casing, the other partition dividing the casing into a pair of compartments, a diaphragm in each compartment dividing it into a pair of chambers, and each chamber having a port through the casing.

7. A relay valve for vacuum brakes comprising a casing having a pair of partitions therein, one having an opening and valve seat and the other a bearing, said partition with the valve seat defining an air chamber between it and the end wall of the casing, a spring closed valve normally urged upon said seat, the other partition defining one wall of a control chamber, said partitions defining an intermediate chamber, a diaphragm in each of the control and intermediate chambers, the diaphragm in the intermediate chamber dividing it into a brake chamber and a pressure chamber, and a valve sleeve secured to both diaphragms with one end portion slidably mounted in said bearing and its other end engageable with said spring closed valve.

8. A relay valve for vacuum brakes comprising a casing having a pair of partitions therein, one having an opening and valve seat and the other a bearing, said partition with the valve seat defining an air chamber between it and the end wall of the casing, a spring closed valve normally urged upon said seat, the other partition defining one wall of a control chamber, said partitions defining an intermediate chamber, a diaphragm in each of the control and intermediate chambers, the diaphragm in the intermediate chamber dividing it into a brake chamber and a negative pressure chamber, and a valve sleeve secured to both diaphragms with one end slidably mounted in said bearing and its other end engageable with said spring closed valve, said sleeve when disengaged from said spring closed valve connecting said brake chamber and negative pressure chamber.

9. A relay valve for vacuum brakes comprising a casing having a pair of partitions therein, one having an opening and valve seat therein and the other a bearing, said partition with the valve seat defining an air chamber between it and the end wall of the casing, a spring closed valve normally urged upon said seat, the other partition defining one wall of a control chamber, said partitions defining an intermediate chamber, a diaphragm in each of the control and intermediate chambers, the diaphragm in the intermediate chamber dividing it into a brake chamber and a negative pressure chamber, the other diaphragm in the control chamber dividing it into negative pressure and variable pressure chambers, a valve sleeve secured to both diaphragms and having both ends open, and one of said ends being engageable with spring closed valve.

10. A relay valve for vacuum brakes comprising a casing having a pair of partitions therein, one having an opening and valve seat therein and the other a bearing, said partition with the valve seat defining an air chamber between it and the end wall of the casing, a spring closed valve normally urged upon said seat, the other partition defining one wall of a control chamber, said partitions defining an intermediate chamber, a diaphragm in each of the control and intermediate chambers, the diaphragm in the intermediate chamber dividing it into a brake chamber and a negative pressure chamber, the other diaphragm in the control chamber dividing it into negative pressure and variable pressure chambers, a valve sleeve secured to both diaphragms and having one end open and engageable with said spring closed valve and its other end closed, and said sleeve having an opening between its ends always in communication with the intermediate negative pressure chamber.

11. A vacuum brake system including in combination, a power chamber, a vacuum reservoir, a manifold and a control line, of a relay valve having a valve normally open to the atmosphere and valve means normally open to connect the reservoir and manifold, and means within the relay valve for closing the air valve and opening the manifold to the power chamber prior to closing the reservoir off from the manifold upon operation of the relay valve to apply the brakes.

12. A vacuum brake system including in combination, a power chamber, a vacuum reservoir, a manifold and a control line, of a relay valve casing having a pair of normally open valves at opposite ends thereof, and adapted to close upon opposed seats, a central low pressure chamber, a pair of open ended sleeves movable in opposite directions and adapted to hold said valves unseated, and a plurality of diaphragms supporting each sleeve and providing five compartments, one being connected with the reservoir and with the central low pressure chamber through one of said sleeves, the second and fourth compartments being connected with the control line, and the fifth compartment being connected with the atmosphere, and the second sleeve being movable to connect the low pressure chamber with the power chamber.

13. A vacuum brake system including in combination, a power chamber, a vacuum reservoir, a manifold and a control line, of a relay valve casing having a reservoir chamber at one end and an atmospheric chamber at its opposite end and said chambers having opposed valve seats, valves normally urged toward said seats, a pair of open ended sleeves movable in opposite directions and adapted to normally seat against said valves and press them off of their respective seats, a pair of diaphragms supporting each sleeve, the innermost pair of diaphragms providing a manifold pressure chamber with a spring disposed therein for normally urging the two sleeves outwardly in opposite directions, the pair of diaphragms connected with one sleeve and dividing a portion of the casing into a pair of chambers one of which is a control chamber, the sleeve connected with said pair of diaphragms communicating at one end with said manifold pressure chamber and having its opposite valve engaging end provided with openings, the other pair of diaphragms connected to the other sleeve defining a space divided by a partition into a control chamber and a high pressure chamber, and the outermost diaphragm of said last named pair separating the high pressure chamber from a brake chamber.

14. A vacuum brake system including in combination, a power chamber, a vacuum reservoir, a manifold and a control line, of a relay valve casing having a reservoir chamber at one end and an atmospheric chamber at its opposite end and said chambers having opposed valve seats, valves normally urged toward said seats, a pair of open ended sleeves movable in opposite directions and adapted to normally seat against said valves and press them off of their respective seats, a pair of diaphragms supporting each sleeve, the innermost pair of diaphragms providing a manifold pressure chamber with a spring disposed therein for normally urging the two sleeves outwardly in opposite directions, the pair of diaphragms connected with one sleeve and dividing a portion of the casing into a pair of chambers one of which is a control chamber, the sleeve connected with said pair of diaphragms communicating at one end with said manifold pressure chamber and having its opposite valve engaging end provided with openings, the other pair of diaphragms connected to the other sleeve defining a space divided by a partition into a control chamber and a high pressure chamber, and the outermost diaphragm of said last named pair separating the high pressure chamber from a brake chamber and said last named sleeve having one end communicating with said manifold chamber and its other end imperforate to engage its complementary valve and cut off communication between said brake chamber and manifold chamber when it engages its respective valve.

15. A vacuum brake system including in combination, a power chamber, a vacuum reservoir, a manifold and a control line; of a relay valve having an air valve normally open to the atmosphere and a check valve normally open to connect the reservoir and manifold, means within the relay valve for closing the air valve and opening the manifold to the power chamber while the check valve remains open, and means for closing the check valve to cut off the reservoir from the manifold upon operation of the relay valve to apply the brake.

16. A vacuum brake system including in combination, a power chamber, a vacuum reservoir, a manifold and a control line, of a relay valve having an air valve normally open to the atmosphere and a check valve normally open to connect the reservoir and manifold, means within the relay valve for closing the air valve and opening the manifold to the power chamber, while the check valve remains open, means for holding the check valve open until the air valve closes, and said last named means operating to close the check valve when the pressure in the brake chamber and reservoir are substantially equalized.

17. A control valve comprising a casing having an air chamber with a valve seat, a valve normally urged with its seating face toward said seat, a diaphragm dividing said casing into a pair of chambers and having a hollow hub normally communicating said pair of chambers and adapted to be moved to seat upon said valve to cut off communication between said pair of chambers and to move said valve off of its seat to establish communication between said air chamber and one of said last named pair of chambers.

18. A control valve comprising a casing having a partition with an opening and a concentric valve seat dividing the casing into an air chamber and a brake chamber, a valve in said air chamber normally urged with its seating face toward said seat, a diaphragm separating the brake chamber from a third chamber and having a hollow hub normally communicating said last two named chambers and adapted to be moved to seat upon said valve to cut off communication between said last named pair of chambers and to move said valve off of its seat to establish communication between said air and brake chambers.

JOHN R. ALMOND.
GEORGE W. UPP.